United States Patent [19]
Takeichi et al.
[11] 3,740,540
[45] June 19, 1973

[54] DIAL ILLUMINATING DEVICE

[75] Inventors: Kenzo Takeichi, Hirakata-shi; Shigeru Hama, Moriguchi-shi, both of Japan

[73] Assignee: Matsushita Electric Industrial Co., Ltd., Osaka, Japan

[22] Filed: Feb. 19, 1969

[21] Appl. No.: 800,639

[52] U.S. Cl. .............................. 240/2.1, 116/124.4
[51] Int. Cl. .............................. G01t 11/28
[58] Field of Search ........... 116/129, 124.1, 124.2, 116/124.3, 124.4; 40/130, 130 K; 240/1 EI, 2.1, 8.16, 9.5

[56] References Cited
UNITED STATES PATENTS

| | | | |
|---|---|---|---|
| 2,132,094 | 10/1938 | Brodton | 40/130 K UX |
| 2,378,249 | 6/1945 | Ruth | 40/130 K UX |
| 2,561,885 | 7/1951 | Prideaux et al. | 40/130 |
| 2,613,630 | 10/1952 | McNairy | 116/129 E |
| 2,646,637 | 7/1953 | Nierenberg | 40/130 K |
| 2,712,593 | 7/1955 | Merchant | 240/2.1 |
| 2,761,056 | 8/1956 | Lazo | 240/2.1 |
| 3,464,133 | 9/1969 | De Poray | 40/130 K |
| 3,538,322 | 11/1970 | Arsem | 240/9.5 |

*Primary Examiner*—Louis J. Capozi
*Attorney*—Stevens, Davis, Miller & Mosher

[57] ABSTRACT

A dial illuminating device for use in a dial device for a radio receiver or the like, which is capable of illuminating the dial plate uniformly and clearly.

1 Claim, 10 Drawing Figures

Patented June 19, 1973 3,740,540

3 Sheets-Sheet 1

INVENTORS
Kenzo Takeichi
Shigeru Hama
BY Stevens, Davis, Miller & Mosher
ATTORNEYS

INVENTORS

Kenzo Takeichi

Shigeru Hama

BY Stevens, Davis, Miller & Mosher

ATTORNEYS

Patented June 19, 1973 3,740,540

3 Sheets-Sheet 3

INVENTORS

Kenzo Takeichi

Shigeru Hama

BY Stevens, Davis, Miller & Mosher

ATTORNEYS

DIAL ILLUMINATING DEVICE

This invention relates to a dial illuminating device for use in a dial device for a radio receiver or the like.

In the conventional dial illuminating devices used in a dial device for a radio receiver, it is usual practice to have the dial plate directly illuminated by pilot lamps or the like. In such conventional arrangement, therefore, a number of pilot lamps are used to illuminate the dial plate as uniformly as possible. Disadvantageously, however, the use of many pilot lamps makes the circuit complicated and also increases power consumption. From the standpoint of design, too, such conventional arrangement is disadvantageous in that the pilot lamps are seen through the dial plate because the latter is directly illuminated from the rear surface by these lamps.

The present invention is intended to overcome the aforementioned drawbacks. In accordance with the present invention, there is provided a dial illuminating device wherein use is made of a light converting member of a transparent material configured in a triangular shape and formed with a surface made oblique with respect to a dial plate and adapted to serve as a surface of irregular reflection, so that a relatively large dial plate can be uniformly illuminated by one or a small number of pilot lamps.

It is a primary object of the present invention to provide an illuminating device capable of illuminating a dial plate uniformly and clearly.

Another object of the present invention is to realize harmony of light rays by gradually changing the color of the dial plate.

Still another object of the present invention is to provide a mechanism capable of easily changing the color of a dial plate with the aid of a band switching shaft or other operating shaft.

Other objects, features and advantages of the present invention will become apparent from the following description taken in conjunction with the accompanyings, in which.

Figure 1:
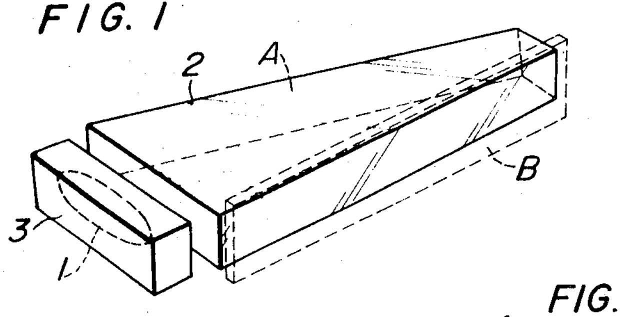
FIG. 1 is a perspective view showing the essential elements of the dial illuminating device according to an embodiment of the present invention.
Figure 2:
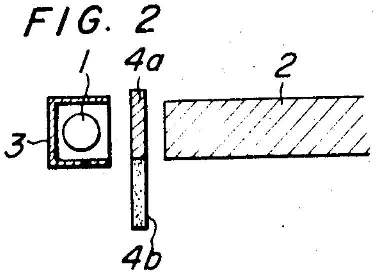
FIGS. 2 and 3 are views useful for explaining the operation of the dial illuminating device shown in FIG. 1.
Figure 3:
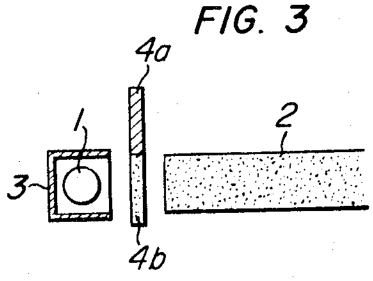

Referring to FIGS. 1 to 3 of the drawings, the reference numeral 1 represents a light source such as a lamp or the like, 2 a light converting member of a triangular shape formed by a transparent material such as glass, plastic or the like, one surface A of which being made oblique with respect to a dial plate B and serving as a surface of irregular reflection, and 3 a reflector cover mounted in such a manner as to cover the light source 1 to thereby direct light rays from the light source 1 to the end surface of the light converting member 2. **4*a* and 4*b* denote colored filters interposed between the light source 1 and the light converting member 2** respectively, these colored filters being adapted to be moved either upwardly and downwardly or leftwardly and rightwardly.

With the foregoing arrangement, light rays from the light source 1 are colored by passing through the colored filters **4*a* and 4*b* and then enter the light converting member 2 so as to be irregularly reflected at the surface of irregular reflection A and directed toward the dial plate B. In this case, the light rays arriving at the dial plate B are mellow because they are subjected to irregular reflection at the surface of irregular reflection A of the light converting member so as to be converted to indirect light rays. Furthermore, the light converting member 2 is lit up uniformly as a whole since it is illuminated by the light rays irregularly reflected at the surface of reflection A onto which are irradiated the light rays emanating from the light source 1**, so that the dial plate B is also illuminated uniformly throughout the entire surface thereof.

The colored filters **4*a* and 4*b* are adapted to be moved either upwardly and downwardly or leftwardly and rightwardly, as described above. By moving these filters upwardly or downwardly for example, it is possible to change the color of light rays irradiated onto the dial plate B. That is, when the light rays from the light source 1 are irradiated onto the light converting member 2 through the colored filter 4*a***, the right rays arriving at the dial plate B are colored in the color of *a*, and when irradiated onto the light converting member 2 through the colored filter **4*b***, the light rays arriving at the dial plate B are colored in the color of *b*.

By gradually moving the colored plates **4*a* and 4*b*** upwardly or downwardly, the color of the light rays arriving at the dial surface B is also gradually changed. If during the process of such gradual movement, the colors of *a* and *b* blend well together, then a very appealing effect will result. Furthermore, by increasing the number of colored sections of the filters **4*a* and 4*b*** by using additional colors, the dial plate B can be illuminated with more colors, so that a remarkable visual effect is produced to meet different tastes and provide improved aesthetic appeal.

Figure 4:
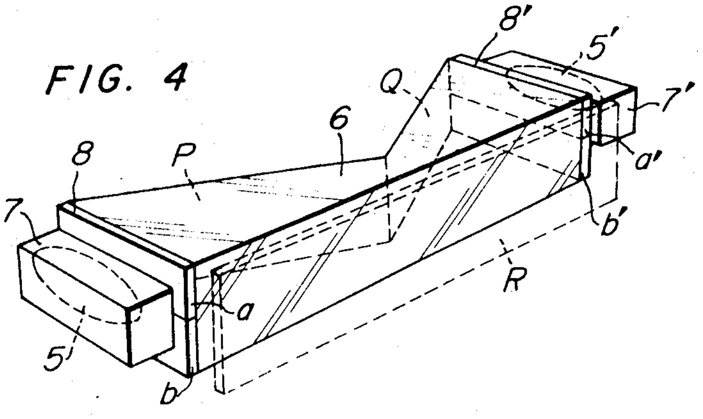
FIG. 4 is a perspective view showing the constitutional elements of the dial illuminating device according to a second embodiment of the present invention.
Figure 5:
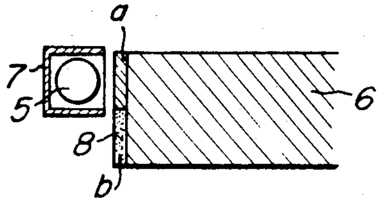
FIGS. 5 to 7 are views useful for explaining the operation of the dial illuminating device shown in FIG. 4.
Figure 6:
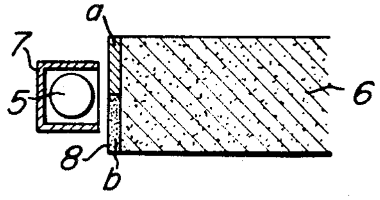
Figure 7:
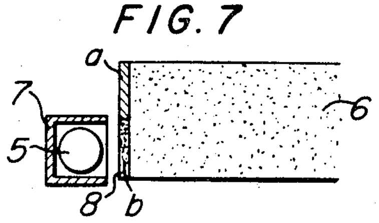

FIG. 4 is a perspective view showing the dial illuminating device according to a second embodiment of the present invention wherein a greater dial plate than that of the device shown in FIG. 1 can be uniformly illuminated. FIGS. 5 to 7 are views useful for explaining the operation of the FIG. 4 device.

In FIGS. 4 to 7, the reference numerals 5 and 5' represent light sources such as pilot lamps which are disposed in opposing relationship to the opposite end surfaces of a light converting member 6 formed by a transparent material having two surfaces of irregular reflection P and Q, respectively. The reference numerals 7 and 7' denote reflector covers provided in such a manner as to cover the light sources 5 and 5' and adapted for upward and downward movement with the latter respectively, and 8 and 8' colored filters interposed between the light source 5 and the light converting member 6 and between the light source 5' and the light converting member 6, these filters 8 and 8' being colored in colors *a*, *b* and *a'*, *b'* respectively.

With the foregoing arrangement, light rays emanating from the light sources 5 and 5' are made to enter into the light converting member 6 through the colored filters 8 and 8' so as to be subjected to irregular reflection at the surfaces of irregular reflection P and Q and then arrive at the dial plate R. In this case, since the light sources 5 and 5′ are adapted to be upwardly and downwardly moved integrally with the douser covers 7 and 7′ as described above, the light rays are colored in the colors *a* and *a′* respectively when the light sources 5 and 5′ are placed in opposing relationship to the sections colored in the colors *a* and *a′* of the colored filters 8 and 8′ respectively, and they are colored in the colors *b* and *b′* respectively when the light sources 5 and 5′ are placed in opposing relationship to the sections colored in the colors *b* and *b′* of the colored filters respectively. When the light sources 5 and 5′ are located at positions corresponding to the borders between the sections colored in the colors *a* and *a′* and between the sections colored in the colors *b* and *b′*, there occurs harmony of the colors *a* and *b*, thus resulting in a very appealing effect.

Furthermore, in the arrangement just described above, the light converting member 6 has two surfaces of irregular reflection P and Q, and the light sources 5 and 5′ are disposed in opposing relationship to the opposite end surfaces of the light converting member 6 in such a manner that the light rays from the light sources 5 and 5′ are made to arrive at the dial plate R after having been subjected to irregular reflection at the surfaces of irregular reflection P and Q. Thus, it is possible to uniformly illuminate a dial plate R which is twice as wide as that of FIG. 1.

Figure 8:
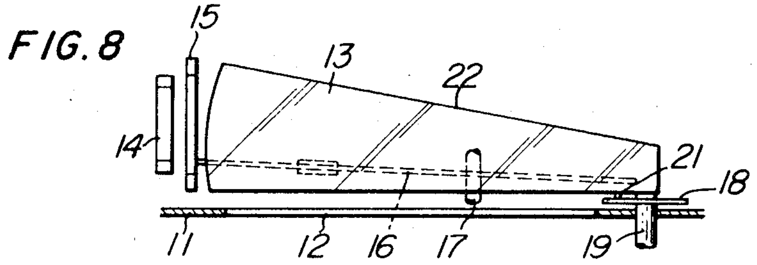
FIG. 8 is a schematic view showing the dial illuminating device according to a third embodiment of the present invention.
Figure 9:
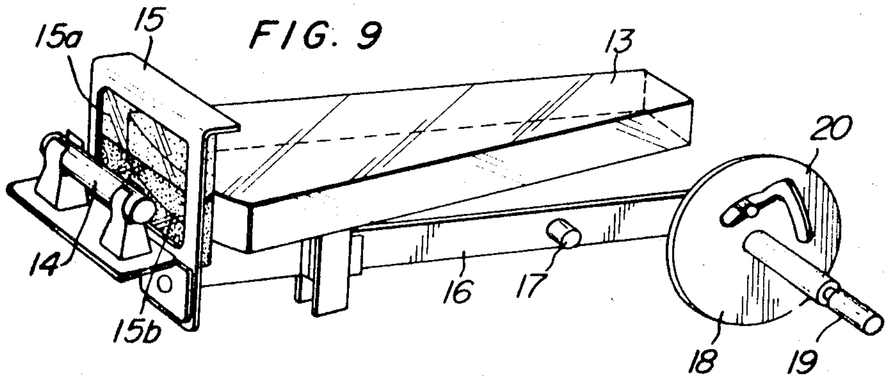
FIG. 9 is a perspective view showing the main portion of the device shown in FIG. 8.
Figure 10:
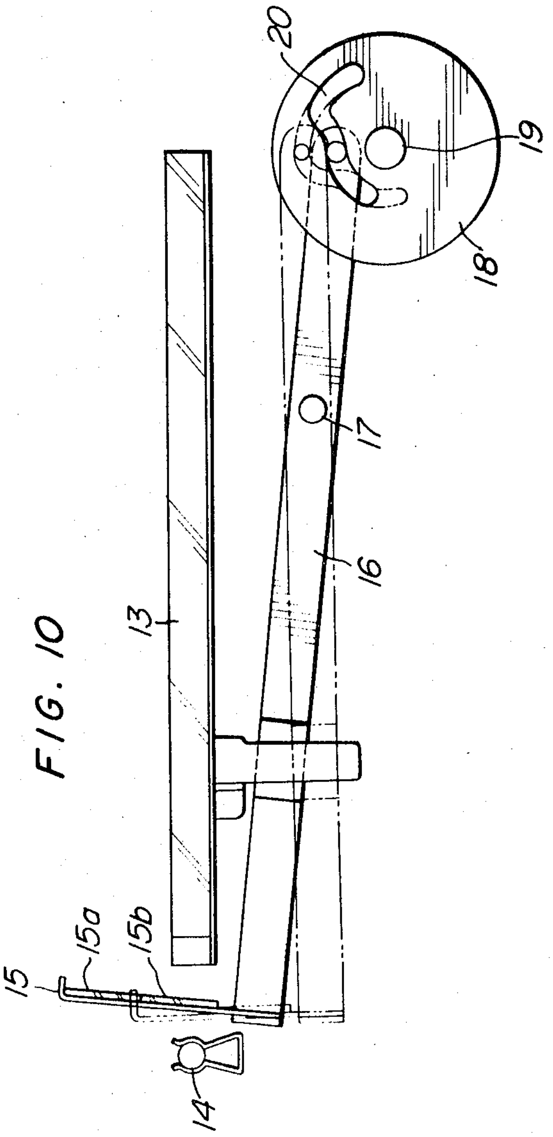
FIG. 10 is a front view thereof.

Referring to FIGS. 8 to 10, there is shown a third embodiment of the present invention wherein a colored filter for coloring light rays from a light source is adapted for movement in interlocking relationship with a band switching shaft or other operating shaft. FIG. 8 is a schematic top plan view showing this device, FIG. 9 is a perspective view showing the main portion of the device, and FIG. 10 is a front view thereof, In FIGS. 8 to 10, the reference numeral 11 represents a cabinet for a radio receiver or the like, 12 a display window formed in the front plate of the cabinet 1, 13 a light converting member of glass, acrylic ester resin or the like configured in a shape similar to that of the light converting member 2 shown in FIG. 1, the light converting member 13 being provided in opposing relationship to the display window 12, 14 a light source such for example as a pilot lamp disposed in opposing relationship to one end surface of the light converting member 13, 15 a colored filter provided between the light source 14 and the light converting member 13, 16 a connecting lever carrying the colored filter 15 to upwardly or downwardly move the latter, 17 a shaft to which is attached the center portion of the connecting lever 16, and 18 an operating disk secured to a band switching shaft or other operating shaft 19 at the center thereof and which is formed in the center portion thereof with a through-hole 20 which is the combination of a smaller arcuate through-hole and a larger arcuate through-hole.

Inserted through the through-hole 20 formed in the operating disk 18 is a connecting pin 21 attached to the fore end of the connector lever 16, and the latter is rotated about the shaft 17 by the rotation of the operating disk 18. Furthermore, the back surface of the light converting member 13 which is made oblique with respect to the dial plate is adapted to serve as a surface of irregular reflection 22, and the colored filter 15 is constituted by filter elements 15*a* and 15*b* colored in different colors.

In the dial illuminating device shown in FIGS. 8 to 10, the colored filter 15 consisting of upper and lower sections colored in different colors is disposed in opposing relationship to one end surface of the light converting member 13, and it is coupled to the connecting lever 16 adapted for rotation in interlocking relationship with the operating shaft 19. By rotating the operating shaft 19, therefore, it is possible to change the color of light rays irradiated onto the light converting member 3 simultaneously with band switching, for example. Furthermore, since the operating shaft 19 and connecting lever 16 are combined with each other by means of the operating disk formed in the center portion thereof with the T-shaped through-hole 20 or combination of the smaller arcuate through-hole and larger arcuate through-hole and the connecting pin 21 attached to one end of the connecting lever 16, the rotation of the operating shaft 19 is accurately converted to the upward or downward movement of the colored filter 15. This operation can be carried out very smoothly.

What is claimed is:

1. A dial illuminating device, comprising a light converting member of a transparent material having a trapezoidal configuration, one oblique surface of said converting member extending along one side of said converting member being adapted to irregularly reflect light-rays projected through one end surface of said light converting member, a dial plate positioned adjacent the oblique surface of said converting member opposing said one surface, a light source mounted adjacent said one end surface of said member to project light-rays on said one oblique surface of said member, and filter means interposed between said one end surface and said light source, said filter means comprising a plurality of transparent color sections which are aligned side-by-side in a predetermined direction, said filter means being movable in said predetermined direction for changing the color of light-rays projected on said one oblique surface of said member.

* * * * *